Nov. 19, 1957 P. EIRINBERG 2,813,505
APPARATUS FOR MAKING SANDING DISKS
Original Filed Aug. 16, 1950 7 Sheets-Sheet 1

Fig. 1

INVENTOR
PHIL EIRINBERG

BY Strauch, Nolan & Diggins
ATTORNEYS

Nov. 19, 1957 P. EIRINBERG 2,813,505
APPARATUS FOR MAKING SANDING DISKS
Original Filed Aug. 16, 1950 7 Sheets-Sheet 2

INVENTOR
PHIL EIRINBERG

BY Strauch, Nolan & Diggins
ATTORNEYS

Nov. 19, 1957 P. EIRINBERG 2,813,505
APPARATUS FOR MAKING SANDING DISKS
Original Filed Aug. 16, 1950 7 Sheets-Sheet 4

INVENTOR
PHIL EIRINBERG

BY Strauch, Nolan & Diggins
ATTORNEYS

Nov. 19, 1957 P. EIRINBERG 2,813,505
APPARATUS FOR MAKING SANDING DISKS
Original Filed Aug. 16, 1950 7 Sheets-Sheet 5

INVENTOR
PHIL EIRINBERG

BY Strauch, Nolan & Diggins
ATTORNEYS

Nov. 19, 1957 P. EIRINBERG 2,813,505
APPARATUS FOR MAKING SANDING DISKS
Original Filed Aug. 16, 1950 7 Sheets-Sheet 7

INVENTOR
PHIL EIRINBERG

BY Strauch, Nolan & Diggins
ATTORNEYS

United States Patent Office 2,813,505
Patented Nov. 19, 1957

2,813,505
APPARATUS FOR MAKING SANDING DISKS

Phil Eirinberg, Sioux City, Iowa, assignor to California Abrasives, Inc., Sioux City, Iowa, a corporation of Delaware Original application August 16, 1950, Serial No. 179,865. Divided and this application October 13, 1953, Serial No. 394,911

10 Claims. (Cl. 118—56)

The present invention relates to apparatus for producing abrasive disks or sheets.

Sanding or abrasive disks and sheets are used widely and in great quantities in industry but heretofore there has been no satisfactory, inexpensive way of producing disks and sheets having maximum cutting efficiency. Heretofore, such disks have usually been prepared by cutting the disks from large sheets of paper, plastic or other sheet material after the sheets have been coated with abrasive. Forming sanding disks in this way is expensive because of the excessive wear on the cutting dies and the resulting disks are inferior because abrasive particles near the cut edge are crushed or broken or even broken entirely away from the sheet which will cause the disk to dig and gouge the surface to be sanded leaving a rough surface requiring further sanding. There is also a tendency to shell the disk and impair its cutting efficiency.

I have found that sanding disks can be made rapidly and efficiently in final form so that there is no need to cut or trim the disk after it is coated with abrasive. It is also possible to secure the most effective and efficient orientation of the abrasive particles so that by sanding disks have the maximum cutting efficiency out to their extreme edges where 90% of the cutting surface is used.

One of the objects of the present invention is to provide an apparatus for making sanding disks or the like at high speed.

Another object is to provide an apparatus for making sanding disks in which the abrasive grains are alined for maximum cutting efficiency.

Another object is to provide an apparatus in which a disk or sheet of material is provided with an abrasive coating the abrasive grains alined in desired position and the sheet discharged from the machine.

Another object is to provide an automatic machine for making uniform sanding disks or sheets by maintaining complete control of the disks or sheets at all times.

My apparatus consists generally of a mechanism which grips a disk 25 of paper, plastic, or other sheet material, moves the disk through a coating station, indicated generally at 26, where the disk is coated with an adhesive such as rubber, glue, resin or the like, then through a station 27 where abrasive grit is dropped on the still tacky adhesive. The disk is then turned over so that the coated face is down, then reinverted and given a second coat of adhesive or resin at a coating station 28. After passing the coating station 28 and after the second coating has had an opportunity to set, the disk is released and the transfer arm freed to receive a new disk to carry it through the same cycle.

Figure 1:
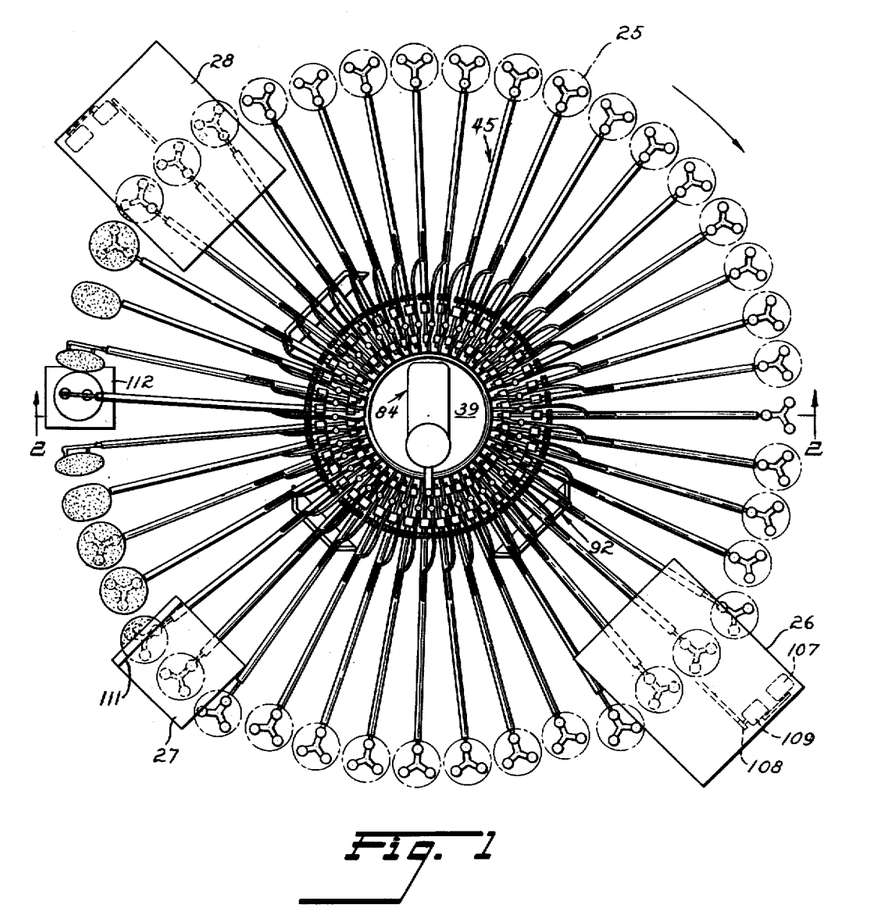
Figure 1 is a top plan view of a preferred form of apparatus embodying my invention.
Figure 2:
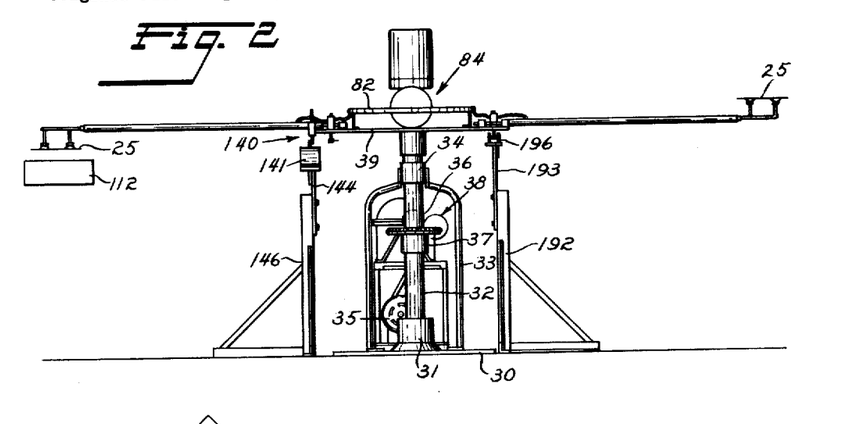
Figure 2 is a section taken on line 2—2 of Figure 1.

One efficient form of apparatus for carrying out these various steps and moving the disk through the various stages and operations is illustrated in the drawing. Referring particularly to Figures 1 and 2, this apparatus comprises a base 30 having a suitable bearing 31 for receiving a vertical shaft 32. This shaft 32 is the main shaft driving the transfer mechanism. An open frame 33 extends upward from the base 30 and carries at its upper end a bearing 34 in which the shaft 32 is suitably journalled. A suitable motor such as the electric motor 35, drives a bevel 36 which in turn drives a bevel gear 37 fixed to the shaft 32 between bearings 31 and 34. If desired, a suitable gear reduction mechanism indicated generally at 38 may be provided between the motor 35 and bevel gear 36.

A horizontal table 39 is secured on the top of the shaft 32 to rotate therewith and a plurality of radial transfer arms 45 are carried by the table. The embodiment shown in the drawing has forty three of these arms but a greater or less number of arms can be used depending upon the speed of rotation of the table and other factors. Each of the arms 45 is of identical construction with the others so that only one such arm will be described.

Figures 4, 5:
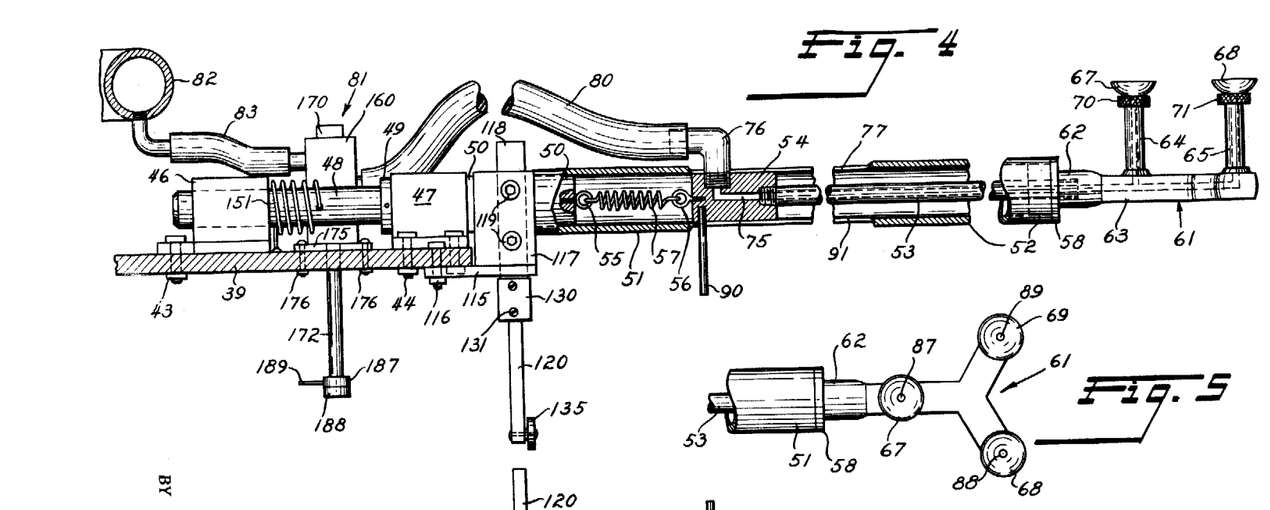
Figure 4 is an enlarged side elevation of one of the arms of my apparatus with parts in section.
Figure 5 is a detailed view of one of the disk holding members.
Figure 6:
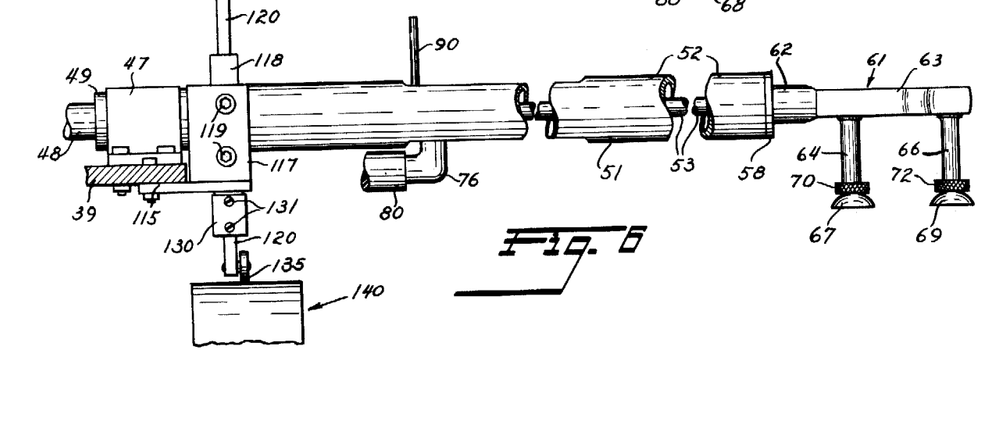
Figure 6 is a side elevation of a portion of the arm shown in Figure 4 with the disk holder in another position of operation.

An arm assembly 45 is shown in detail in Figures 4, 5 and 6 and comprises two spaced bearings 46 and 47 which are secured to the table 39 by screws or bolts 43 and 44, respectively, and in which a radially extending shaft 48 is rotatably mounted. A collar 49 pinned to the shaft 48, prevents outward movement of the shaft 48 by engagement with one side of the bearing 47, and a cap 50, secured to the shaft 48, engages the other side of the bearing 47 and prevents inward movement of the shaft 48. The shaft 48 is thus free to rotate but is held against longitudinal movement by the collar 49 and cap 50.

A sleeve 51 is secured on the cap 50 and projects radially outward therefrom. A guide 52 is secured in the outer end of the sleeve 51 and a pipe 53 is slidable in the guide 52 concentrically of the sleeve 51. The inner end of the pipe 53 is secured in a block 54 which is also slidable in the sleeve 51. Eyelets 55 and 56 are secured to the cap 50 and block 54, respectively, and a spring 57 extending between the eyelets 55 and 56 urges the block 54 and pipe 53 inward toward the table 39. The guide 52 is prevented from moving into the sleeve 51 by a flange 58 which engages the end of the sleeve 51.

A disk holder, indicated generally at 61, has a generally Y-shaped body 63 which is enlarged at 62 and secured to the outer end of the pipe 52. The enlarged portion 62 engages the outer end of guide 52 to limit the inward movement of the block 54, pipe 53 and disk holder 61 under the influence of the spring 57.

The disk holder 61 has three upstanding tubes 64, 65 and 66 terminating in cups 67, 68 and 69 respectively. The tubes 64, 65 and 66 are provided with knurled adjusting nuts 70, 71 and 72 for adjusting the position of the cups 67, 68 and 69 respectively.

The body 63 and tubes 64, 65 and 66 are provided with central bores communicating with the pipe 53 which in turn communicates with a bore 75 in the block 54. An elbow 76 is threaded into the block 54 in communication with the bore 75 and extends through a longitudinal slot 77 in the sleeve 51. A flexible rubber tube 80 connects the elbow 76 to a valve indicated generally at 81 and the valve 81 is in turn connected to a manifold 82 by a flexible pipe 83. A vacuum pump, indicated generally at 84 (Figure 2), is carried by the table 39 and operatively connected to the manifold 82 by means of a flexible tube so as to provide suction for the cups 67, 68 and 69 on the disk holder 61. As shown in Figure 5, the cups 67, 68 and 69 have central openings 87, 88 and 89 respectively, in alinement with bores 64, 65 and 66 so that when suction is applied by the vacuum pump 84, the cups 67, 68 and 69 will securely hold a disk or sheet 25.

When a disk 25 carried by the disk holder 61 is passed through the coating station 26, the abrasive station 27, or coating station 28, its movement is preferably along a straight line rather than an arcuate line in order that the whole area of the disk will be moving at a uniform rate and thus receive a uniform coating. This straight line movement is accomplished by cams and, since the cam structure and operation is substantially the same for each station, only one will be described.

Figure 3:
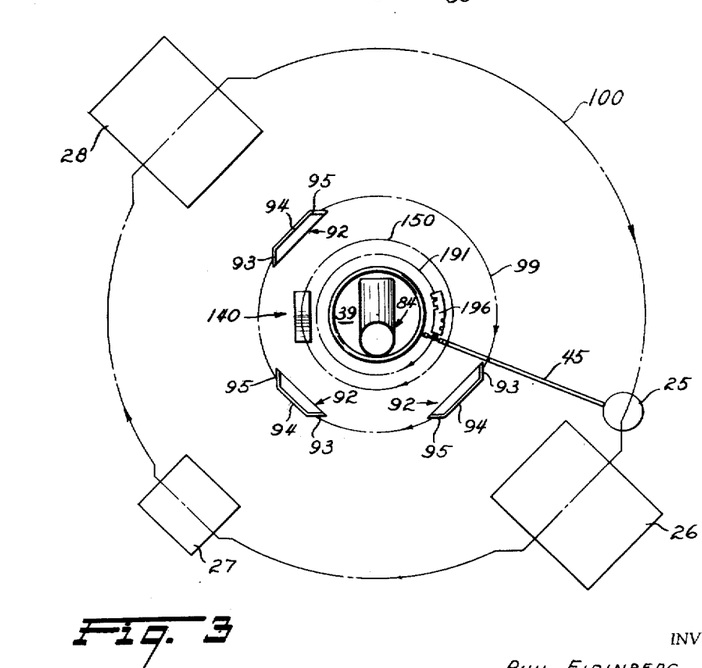
Figure 3 is a diagrammatic top plan view illustrating the movement of the disk holder at various stages of operation.

A pin 90 is secured in the block 54 and projects downward through a slot 91 in the sleeve 51 into the path of a cam indicated generally at 92 (Figures 1, 3, 17 and 18). The cam 92 has an inclined forward surface 93, an inclined rear surface 95 and a flat vertical surface 94. The cam 92 is carried by a frame 96 which is firmly secured to the floor adjacent the base 30. Figure 3 shows the paths of a pin 90 and disk 25 indicated by the lines 99 and 100 respectively. The cam surface 93 engages the pin 90 and pushes the pin 90, block 54, pipe 53 and disk holder 61 outward against the spring 57 beyond the normal arcuate path and cam surface 94 causes the disk 25 to move through the coating station 26 in the straight line indicated by line 100.

Figures 19, 20:
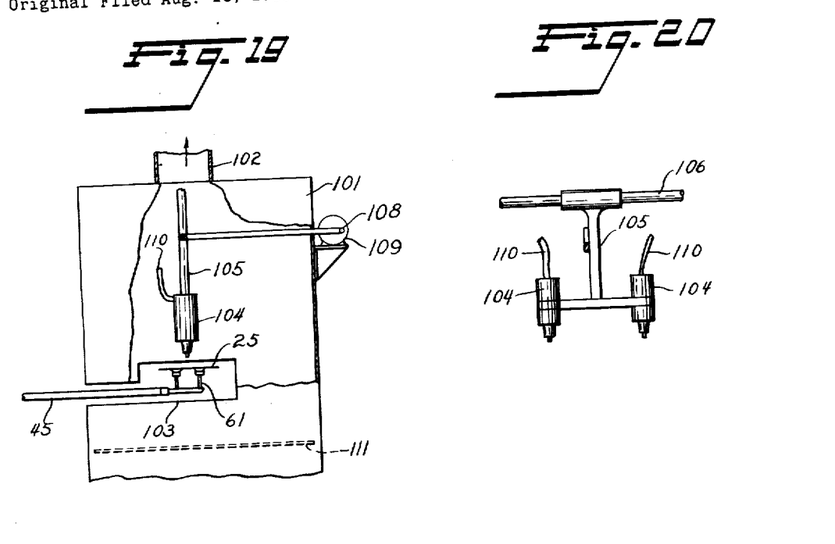
Figure 19 is a side elevation of my coating mechanism with parts broken away to show internal structure.
Figure 20 is a front elevation of the spraying apparatus.

The coating of the disks 25 with adhesive at the station 26 is preferably carried out in a housing 101 (Figure 19) which may have an exhaust pipe 102 to carry off vapors or droplets of adhesive. The housing 101 is provided with a slot 103 through which the arms 45, disk carriers 61 and disks 25 can pass.

I prefer to spray the adhesive on the disks through one or more nozzles 104 (Figures 19 and 20) which may be of known form such as is used for spraying paint or lacquer. The nozzles 104 are preferably mounted on an arm 105 which is pivotally mounted on a shaft 106 secured to the housing 101 for swinging movement in a plane perpendicular to the plane of the disks 25. A motor 107 drives a crank 108 through reduction gearing 109 to oscillate the bracket 105 and move the nozzles 104 back and forth above the disks 25. Adhesive may be supplied to nozzles 104 through the arm 105 and compressed air for spraying the adhesive may be supplied through hoses 110 from a suitable source not shown. A catch pan 111 may be provided in the housing 101 beneath the disk 25 to catch adhesive which does not strike the disk. The adhesive from the catch pan may then be reused.

After the disks have been coated with adhesive at station 26, the table 39 carrying arms 45 continues to rotate and moves the coated disks 25 to and through the station 27 where the abrasive is applied. The station 27 is located sufficiently close to the station 26 that the adhesive on the disks 25 is still soft and tacky when the disks pass the station 26.

The abrasive applying apparatus comprises a hopper having walls which slope downwardly and inwardly to a narrow slot 111 above the disks 25. The hopper is filled with suitable abrasive such as emery, corundum, garnet, sand or the like of the desired size and this abrasive feeds and drops by gravity onto the surface of the adhesive coated disk 25. Since the adhesive is still soft and tacky it holds the abrasive on the disk.

After the abrasive has been applied, I prefer to invert the disk to improve the orientation of the abrasive grains on the disk and, at the same time, remove excess abrasive. The operation of my apparatus, that is, the speed of rotation of the table 39 and arms 45, the nature of the adhesive used and the distance between coating station 26 and abrasive applying station 27 are so controlled that the adhesive is still soft and tacky after the disk 25 leaves the abrasive applying station 27. When the disk is inverted in this condition, the abrasive grains tend to move and orient themselves so that they project outward from the surface of the disk 25 and thus present more efficient cutting edges. If desired, this effect may be increased by the use of a suitable magnet indicated at 112 beneath the inverted disk.

The mechanism for inverting the disks 25 is shown in Figures 4, 6, 7, 8, 9, 13 and 14. A bracket 115 is secured to table 39 by screws or bolts 116 and has a vertical portion 117 to which a vertical slide guide 118 is secured by screws or bolts 119. A rack bar 120 is vertically slidable in the guide 118 and is preferably provided with a vertical keyway 121 for engagement with a key 122 on the guide 118 to insure vertical movement of the rack bar. The teeth 125 of the rack bar 120 engage a gear 126 which is secured to the cap 50 by a pin or set screw 127. The gear 126 is mutilated as indicated at 128 to limit the movement of the rack bar 120.

Figures 7, 8, 9:
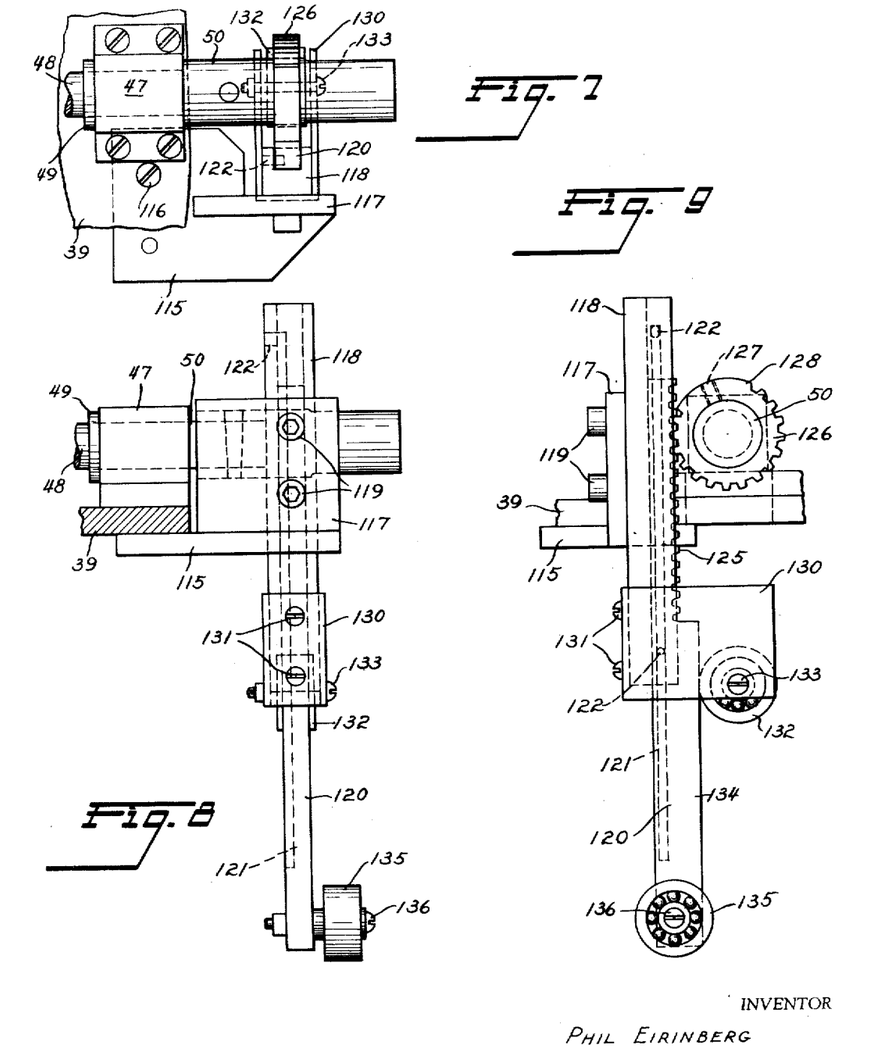
Figure 7 is a top plan view of the disk holder rotating mechanism.
Figure 8 is a side elevation of the mechanism shown in Figure 7.
Figure 9 is a front elevation of the mechanism shown in Figure 7.

A U-shaped bracket 130 is attached to the guide 118 below the bracket 115 by screws 131 and a ball bearing assembly 132 is rotatably secured between the legs of bracket 130 by a bolt 133. The ball bearing assembly 132 engages a plate or extension 134 on the lower portion of the rack bar 120 to hold the rack bar 120 securely in the guide 118 and prevent any lateral movement of the rack bar. A ball bearing assembly 135 is secured to the lower end of the rack bar 120 by a bolt 136.

Figure 13:
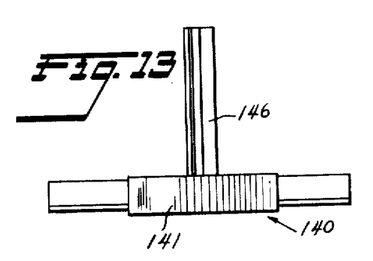
Figure 13 is a top plan view of the disk holder rotating cam of my apparatus.
Figure 14:
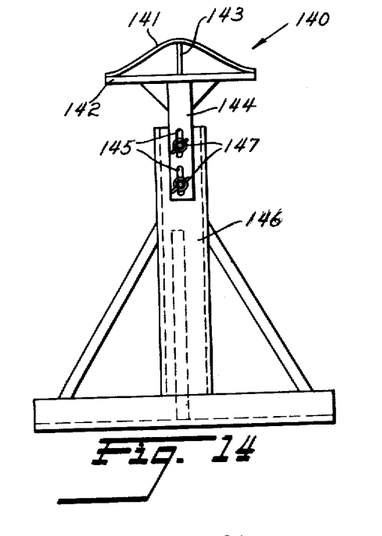
Figure 14 is a side elevation of the cam shown in Figure 13.

The rack bar 120 is actuated by a cam indicated generally at 140. In the embodiment shown, the cam 140 comprises a vertically deformed plate 141, preferably of metal, mounted upon a platform 142 and preferably reinforced at its highest point by a brace 143. The platform 142 is carried by a slide 144 provided with elongated vertical slots 145 and adjustably secured on a frame 146 by wing nuts 147. The frame 146 is secured to the floor so that the cam 140 is in the path of the ball bearing roller 135 on rack bar 120 indicated by line 150 in Figure 3 and sufficiently close to the abrasive applying station 27 that the cam 140 will actuate the rack bar 120 to invert the disk 25 while the adhesive is still soft and tacky.

As the table 39 carrying the arm assemblies rotates, the cam 140 engages the roller 131 on rack bar 120 and raises the rack bar causing the gear 126, shaft 48, sleeve 51 and other parts of the arm 45 to rotate and invert the disk 25. By changing the shape of the cam 140, the disk 25 may be held in this inverted position for a substantial period of time. A spring 151 (Figure 4) secured at one end to the table 39 and at the other to the shaft 48 returns the shaft 48 and other parts of the arm 45 to normal position with the coated surface of the disk 25 facing upward after the roller 131 passes the cam 140.

After the disk 25 has been reinverted, it is preferably given a further coating at station 28. This further coating fixes the abrasive grains in their oriented positions and strengthens and reinforces them on the disk 25. Any adhesive covering the cutting edges or points of the abrasive grains is removed as soon as the disk is used.

Figure 21:
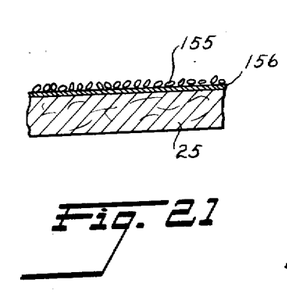
Figures 21, 22 and 23 are enlarged diagrammatic sectional views illustrating different stages in the production of my sanding disks.
Figure 22:
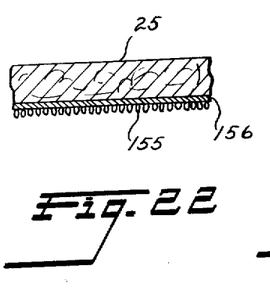
Figure 23:
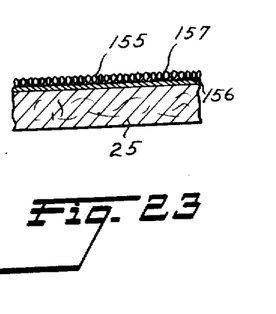

The production of my disks is illustrated in enlarged diagrammatic form in Figures 21, 22 and 23. Abrasive particles are not symmetrical and for clarity of explanation the particles 155 are shown in Figures 21, 22 and 23 as being of elongated form. When the particles 155 are dropped on the disk 25 with the adhesive coating 156 thereon, the particles tend to lie flat as indicated in Figure 21, so that they will rub rather than cut a work piece. When the disk is inverted as shown in Figure 22 while the adhesive 156 is still soft and tacky, the particles tend to hang down from the disk and orient themselves into positions perpendicular to the disk with the cutting edges projecting outward. During this time the adhesive 156 is hardening and tends to hold the grains 155 in oriented position. The second coating indicated at 157 in Figure 23 fills the interstices between the grains 155 and securely fixes and reinforces them in their oriented positions.

The coating mechanism used at station 28 may be identical with that used at station 26 and the second coating may have the same composition or may have a different composition since its function is different.

After it passes the station 28, the disk 25 is ready for use as soon as the second coating hardens. If desired, a heating chamber may be provided adjacent the station 28 to expedite hardening but ordinarily this is not necessary if the coating composition is such that it hardens quickly in the air at room temperature.

Figure 10:
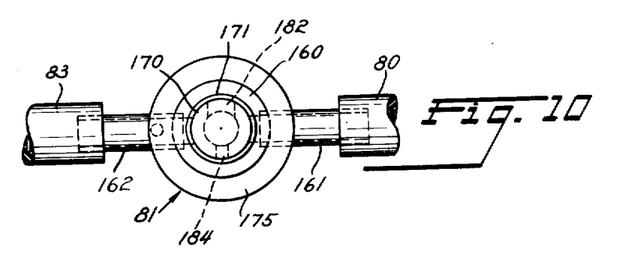
Figure 10 is a top plan view of the vacuum control valve of my apparatus.
Figures 11, 12:
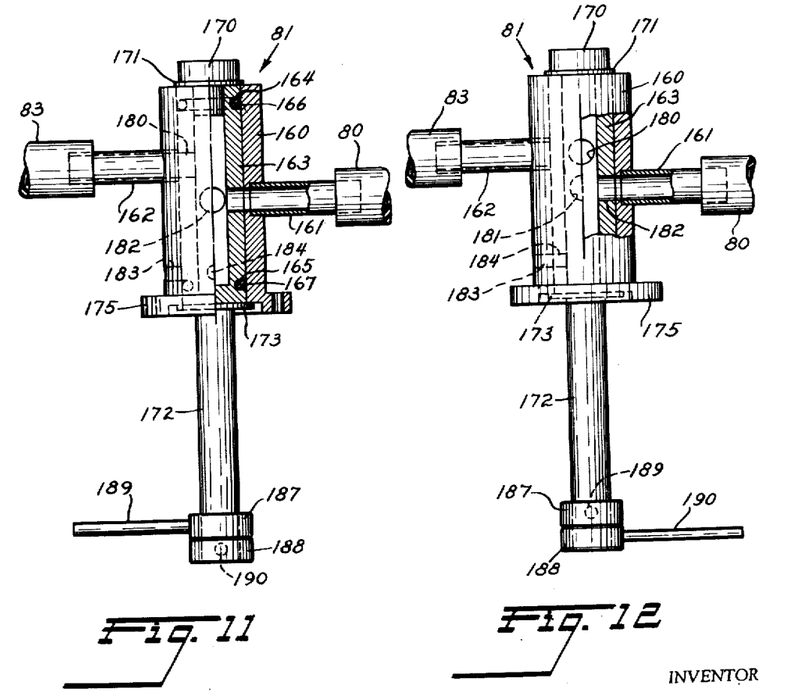
Figure 11 is a side elevation of the valve shown in Figure 10 with the valve parts in disk holding position.
Figure 12 is a side elevation similar to Figure 11 with the valve parts in release position.

When the second coating has hardened, the suction on the cups 67, 68 and 69 is released so that the finished disks may be removed. The valve 81 for releasing the suction when a finished disk is to be removed and for reapplying suction to hold a new disk is best shown in Figures 10, 11 and 12.

The valve 81 has a cylindrical tubular body 160 provided with fittings 161 and 162 to receive the flexible tubes 80 and 83 respectively. A second tubular member 163 is rotatably mounted within the body 160 and is provided at its upper and lower ends with annular grooves 164 and 165 respectively. Sealing rings 166 and 167 in the grooves 164 and 165 respectively, engage the inner wall of the body 160 to form air tight seals at the upper and lower ends of the valve. The upper end of the tubular member 163 is closed with a plug 170 and a flange or washer 171 projects beyond the member 163 and engages the top of the body 160. The lower portion 172 of the member 163 is solid and projects down below the body 160. A snap ring 173 on the lower portion 172 of member 163 engages the bottom of the body 160 and, with flange or washer 171, prevents longitudinal movement of member 163 in body 160 while permitting free relative rotary movement. The body 160 is provided at its lower end with a flange 175 by which the valve 81 is secured to the table 39 by screws or bolts 176 (Figure 4).

The member 163 has an opening 180 at the level of fitting 162 and two openings 181 and 182 at the level of the fitting 161. The opening 181 is located so that it is in alinement with fitting 161 when the opening 180 is in alinement with fitting 162 while the opening 182 is located so that when it is in alinement with fitting 161, the opening 180 is out of alinement with fitting 162 and the connection to the suction manifold 82 and pump 84 thus closed. The body 160 is provided with a fourth aperture 183 near its lower end and the member 163 has an opening 184 which registers with the aperture 183 when the opening 182 is in alinement with fitting 161.

In the embodiment illustrated, fittings 161 and 162 are on opposite sides of body 160 with aperture 183 on the same side of the body as fitting 162. Openings 180 and 181 are on opposite sides of member 163. Openings 182 and 183 are also on opposite sides of member 163 and spaced ninety degrees from openings 180 and 181. Figures 10 and 11 show the valve 81 in suction position with openings 180 and 181 in alinement with fittings 162 and 161 respectively so that suction is applied to the cups 67, 68 and 69 and aperture 183 closed. Figure 12 shows the valve in release position in which the member 163 has been turned ninety degrees from the position shown in Figures 10 and 11 so that fitting 162 is closed cutting off the suction, and fitting 161 is opened to the air through openings 182 and 184 and aperture 183.

The body 163 of valve 81 is rotated through ninety degrees by means of rings 187 and 188 secured at the lower end of lower portion 172 and carrying arms 189 and 190 respectively which are angularly spaced ninety degrees apart. The lower portion 172 of member 163 projects downward below the table 39 and moves along the path indicated by the line 191 in Figure 3.

Figure 15:
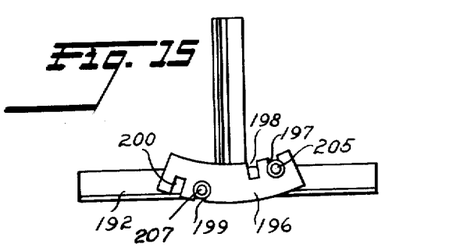
Figure 15 is a top plan view of the vacuum valve control mechanism.
Figure 16:
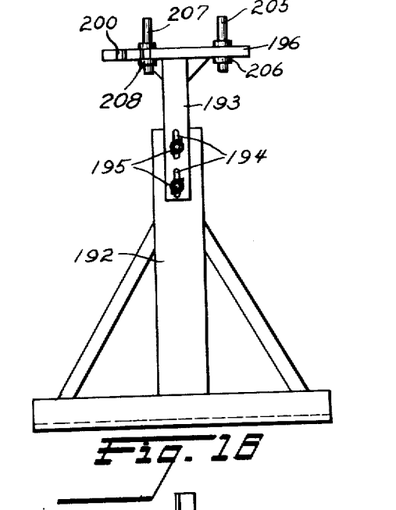
Figure 16 is a side elevation of the vacuum valve control mechanism shown in Figure 15.
Figure 17:
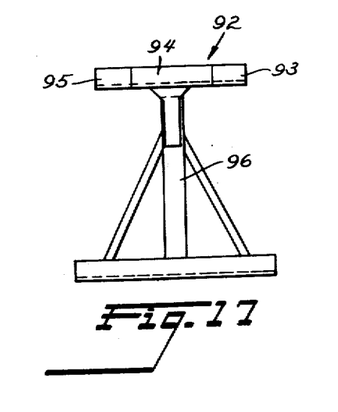
Figure 17 is a side elevation of the cam for controlling the direction of travel of the disk holders through the coating station.
Figure 18:
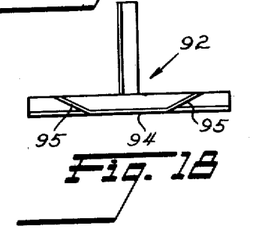
Figure 18 is a top plan view of the cam shown in Figure 17.

The means for actuating the arms 189 and 190 to rotate the member 163 is illustrated in Figures 2, 15 and 16 and comprises a frame 192 which is secured to the floor adjacent the base 31. A support 193 provided with vertical slots 194 is adjustably secured to the frame 192 by wing nuts 195 and carries at its upper end a horizontal arcuate plate 196 which is substantially concentric with the shaft 32. The plate 196 has radial notches 197 and 198 extending inward from its inner edge near one end and radial notches 199 and 200 extending inward from its outer edge near the other end. An upstanding lug 205 shown in Figures 15 and 16 in notch 197 is detachably and adjustably secured in one of the notches 197 or 198 by nuts 206 and a second upstanding lug 207 shown in Figures 15 and 16 in notch 199 is detachably and releasably secured in one of the notches 199 or 200 by nuts 208. The lugs 205 and 207 are spaced different radial distances from the shaft 32 so that as the table 39 rotates, the lower portion 172 of member 163 passes outside of lug 205 and inside of lug 207. When suction is being applied to the cups 67, 68 and 69, the arm 189 on the portion 172 of member 163 extends radially inwardly and as portion 172 passes lug 205, the lug 205 engages arm 189 and turns the member 163 through about ninety degrees from the position shown in Figures 10 and 11 to the position shown in Figure 12 releasing the suction and permitting removal of a finished disk 25. At this time the arm 190 extends radially outward as shown in Figure 12 and, as the table 39 continues to turn, the lug 207 engages the arm 190 and turns the member 163 back from the position shown in Figure 12 to that shown in Figures 10 and 11. By moving the lug 205 from notch 197 to 198, the suction will be cut off later in the cycle and by moving lug 207 from notch 198 to 199 the suction can be reimposed later in the cycle.

The cycle of my apparatus starts just before or just after the arm 190 has been acted upon by the lug 207 to operate the valve 81 and connect the disk holder 61 to the suction manifold 82 and pump 84. A sheet or disk 25 of paper, fiber, plastic or other sheet material is placed on the disk holder 61 and held in position by the suction while the table 39 carrying the arms 45 is being constantly rotated. The sheet or disk 25 is passed through the various steps of coating with adhesive, applying the abrasive grains, orienting the grains, fixing the grains in oriented position and releasing the finished sheet or disk.

The cams 92 for controlling the path of travel of the disk through the coating and abrasive applying stations, the cam 140 for inverting and reinverting the disk and the suction valve actuator 196 are all movable independently to provide greater flexibility for my apparatus since the timing of the individual steps of the cycle, coating, abrasive applying, inverting, coating and releasing might have to be varied due to differing conditions such as changes or variations in the adhesive which change the hardening time of the adhesive.

The sheet or disk 25 is made in its final form before it is coated with abrasive and after coating there is no need for any further cutting or trimming. The abrasive is thus evenly and perfectly coated and preserved out to the extreme edge of the sheet or disk.

The invention may be embodied in other specific forms without departing from the spirit or essential characteristics thereof. The present embodiment is therefore to be considered in all respects as illustrative and not restrictive, the scope of the invention being indicated by the appended claims rather than by the foregoing description, and all changes which come within the meaning and range of equivalency of the claims are therefore intended to be embraced therein.

What is claimed and desired to be secured by United States Letters Patent is:

1. Apparatus for making abrasive sheets comprising a support, a table rotatably mounted on said support for rotation on a vertical axis, an arm carried by said table and projecting radially therefrom, a disk holding mechanism radially slidably mounted on said arm, said disk holding mechanism having a gripping means on one side of said arm for supporting a disk on one side of said arm with its axis perpendicular to the axis of said arm, spray means, means for rotating the table to move the disk holder beneath the spray means, and means including a cam for sliding said disk holder radially of said arm to guide said disk holder in a substantially straight line beneath said spray means.

2. Apparatus for making sanding disks comprising a support, a table rotary mounted on said support for rotation on a vertical axis, an arm mounted on said table and projecting radially therefrom, disk holding means rotatably and slidably mounted at the outer end of said arm, said disk holding means having a gripping means on one side of said arm for gripping the underside of a disk and holding said disk on one side of said arm with its axis perpendicular to the axis of said arm, and holding said disk in substantially horizontal position, means for rotating said table, and means actuated by rotation of said table to rotate said disk holding means to invert said disk.

3. Apparatus as defined in claim 2 in which the means for rotating the disk holding means comprises a gear carried by said arm operatively connected to said disk holding means, a rack for rotating said gear and cam means fixed relative to said support for moving said rack as said table and arm rotate.

4. Apparatus for making sanding disks comprising a support, a table rotatably mounted on said support for rotation on a vertical axis, an arm mounted on said table and projecting radially therefrom, disk holding means rotatably mounted at the outer end of said arm and extending to one side thereof for holding a disk on one side of said arm with its axis substantially perpendicular to the axis of said arm, an abrasive dispensing outlet above said disk holding means, and cam, rack and gear means actuated by rotation of said table to rotate said disk for a first period of time during a rotation of said table and to hold said disk horizontal during a second period of time during the same rotation of said table while the disk is below said dispensing outlet.

5. An apparatus as set out in claim 4 wherein said last named means causes said disk to be inverted after it is moved beyond said dispensing outlet.

6. Apparatus for making sanding disks comprising a support, a table rotatably mounted on said support for rotation on a vertical axis, an arm rotatably mounted on said table for rotation on its own axis and projecting radially from said table, an arm rotating mechanism carried by said table for rotating said arm, a disk holder radially slidably mounted on said arm at the outer end of said arm, said disk holder having a gripping means on one side of said arm for supporting a disk on one side of said arm with its axis perpendicular to the axis of said arm, a mechanism carried by said arm for sliding said disk holder, cam means for actuating the arm rotating mechanism to rotate said arm, and additional cam means for actuating the mechanism to slide said disk holder, said cam means being movable independently of each other and of said support.

7. Apparatus for making sanding disks comprising a support, a table rotatably mounted on said support for rotation on a vertical axis, an arm rotatably mounted on said table for rotation on its own axis and projecting radially from said table, an arm rotating mechanism carried by said table for rotating said arm, a disk holder radially slidably mounted on said arm at the outer end thereof in a position to support a disk with its axis substantially perpendicular to the axis of said arm, an adhesive spray means, means for rotating the table to move the disk holder beneath the spray means, means including a cam for sliding said disk holder radially of said arm to guide said work holder in a substantially straight line beneath said spray means, abrasive supply means for dropping loose abrasive particles, said abrasive supply means being located above the path of said disk holder and spaced from said adhesive spray means, and means for actuating said arm rotating mechanism to invert said disk holder after it passes the abrasive supply means.

8. Apparatus as defined in claim 7 including means for reinverting said disk holder.

9. Apparatus as defined in claim 7 wherein said disk holder consists of three suction devices each having means for adjusting its position independently of the others.

10. Apparatus for making sanding disks comprising a support, a table rotatably mounted on said support for rotation on a vertical axis, an arm rotatably mounted on said table for rotation on its own axis and projecting radially from said table, an arm rotating mechanism carried by said table for rotating said arm, a disk holder mounted on said arm at the outer end thereof in a position to support a disk with its axis substantially perpendicular to the axis of said arm, an adhesive spray means, means for rotating the table to move the disk holder beneath the spray means, abrasive supply means for dropping loose abrasive particles, said abrasive supply means being located above the path of said disk holder and spaced from said adhesive spray means, and means for actuating said arm rotating mechanism to invert said disk holder after it passes the abrasive supply means.

References Cited in the file of this patent

UNITED STATES PATENTS

| Number | Name | Date |
|---|---|---|
| 1,220,552 | Provandie | Mar. 27, 1917 |
| 2,165,364 | Ferngren | July 11, 1939 |
| 2,201,194 | Melton et al. | May 21, 1940 |
| 2,203,572 | Johnson | June 4, 1940 |
| 2,229,116 | Nagy | Jan. 21, 1941 |
| 2,229,490 | Benner et al. | Jan. 21, 1941 |
| 2,281,558 | Cross | May 5, 1942 |
| 2,296,890 | Albertson | Sept. 29, 1942 |
| 2,302,053 | Price | Nov. 17, 1942 |
| 2,404,454 | Owens | July 23, 1946 |
| 2,417,472 | Dorff | Mar. 18, 1947 |
| 2,445,451 | Padelford | July 20, 1948 |
| 2,456,985 | Oglesby | Dec. 21, 1948 |
| 2,487,111 | De Koning | Nov. 8, 1949 |
| 2,573,835 | Dyar | Nov. 6, 1951 |

U. S. DEPARTMENT OF COMMERCE
PATENT OFFICE
CERTIFICATE OF CORRECTION

Patent No. 2,813,505                                          November 19, 1957

Phil Eirinberg

It is hereby certified that error appears in the printed specification of the above numbered patent requiring correction and that the said Letters Patent should read as corrected below.

Column 4, line 37, for "edegs" read -- edges --; column 7, line 41, for "rotary" read -- rotatably --.

Signed and sealed this 4th day of March 1958.

(SEAL)

Attest:
KARL H. AXLINE
Attesting Officer

ROBERT C. WATSON
Commissioner of Patents